United States Patent [19]

Nozawa et al.

[11] 4,334,737
[45] Jun. 15, 1982

[54] ZOOM LENS CAPABLE OF MACRO-PHOTOGRAPHY

[75] Inventors: Hideyo Nozawa, Ohmiya; Tsutomu Mitsuishi, Kawasaki, both of Japan

[73] Assignee: Nippon Kogaku K.K., Tokyo, Japan

[21] Appl. No.: 150,188

[22] Filed: May 15, 1980

[30] Foreign Application Priority Data

Jun. 29, 1979 [JP] Japan .............................. 54-89433[U]

[51] Int. Cl.³ .................................................. G02B 7/10
[52] U.S. Cl. .................................................. 350/430
[58] Field of Search ......................... 350/430, 429, 255

[56] References Cited

U.S. PATENT DOCUMENTS

| 3,731,987 | 5/1973 | Iida et al. | 350/430 |
| 3,765,748 | 10/1973 | Mito | 350/429 |
| 3,980,398 | 9/1976 | von Belvard | 350/430 |
| 4,099,847 | 7/1978 | Ito | 350/430 |

FOREIGN PATENT DOCUMENTS 54-2436 1/1979 Japan.

*Primary Examiner*—Jon W. Henry
*Attorney, Agent, or Firm*—Shapiro and Shapiro

[57] ABSTRACT

A zoom lens capable of macro-photography includes first and second movable lenses coupled to first and second cam rings, respectively. The first and second cam rings are operatively associated so that they rotate as a unit about the optical axis of the lens to axially move the first and second lenses for zooming, but are capable of relative axial movement with respect to one another at any point within the zooming range of the lens to move one lens relative to the other lens for macro-photography.

12 Claims, 2 Drawing Figures

ZOOM LENS CAPABLE OF MACRO-PHOTOGRAPHY

BACKGROUND OF THE INVENTION

1. Field of the Invention

This invention relates to a zoom lens capable of macro-photography.

2. Description of the Prior Art

A zoom lens is already known which includes a focusing lens group, a variator group, a compensator group and a master lens group and in which one of the variator group and the compensator group is moved for macro-photography (focusing) by an operation different from the normal zooming operation.

There is also known a so-called one-hand zoom lens of the type in which zooming and focusing is effected in response to the movements of an operating ring in two directions, namely, a longitudinal or axial movement with respect to the optical axis of the lens and a rotational movement about the optical axis of the lens.

To provide such a one-hand zoom lens with a macro-photography function, Japanese Utility Model Laid-Open Publication No. 2436/1979 discloses a close-up distance adjusting device in an interchangeable zoom-type lens for a camera wherein a first lens group is supported by an outer barrel slideable axially back and forth while rotating relatively to a main body and normally effecting distance adjustment. A plurality of zoom lens groups is provided for effecting zooming by changing the relative position thereof. The groups engage a plurality of cam grooves in a zoom cam barrel rotatable relative to a main body. Each of said cam grooves is further extended from the position of the shortest focal length to form a cam groove extension, in which are disposed an outer barrel connecting member connected to an outer barrel to receive only the rotation thereof relatively to the main body and a zoom barrel connecting member connected to the zoom cam barrel and rotatable relative to the main body and slideable back and forth relative to the zoom cam barrel. A cam is provided on one of said two connecting members and a cam follower is provided on the other connecting member for cam engagement, so that the zoom cam barrel can be induced into rotation along a cam extension only when the first lens group has been located at the closest distance position and the zoom lens groups have been located at the position of the shortest focal length. However, in this device, the change-over to macro-photography becomes possible only after the lens groups have been preset to predetermined positions. This has the disadvantage that macro-photography cannot be accomplished at any desired focal length within the zooming range.

SUMMARY OF THE INVENTION

It is an object of the present invention to provide a one-hand zoom lens having a construction suited for moving one of the variator group and the compensator group for macro-photography at any desired focal length by an operation different from the zooming or the focusing operation.

Briefly stated, in one aspect the invention provides a zoom lens capable of macro-photography which includes first and second movable lens means; means for coupling the first and second lens means together so that they can be moved axially with respect to the optical axis of the lens as a unit, the coupling means being capable of permitting relative axial movement of one lens means with respect to the other lens means; operating means cooperable with the coupling means for moving the first and second lens means as a unit for zooming; and change-over means cooperable with the coupling means for moving one lens means relatively to the other lens means for macro-photography.

The invention will become fully apparent from the following detailed description thereof taken in conjunction with the accompanying drawings.

DESCRIPTION OF THE PREFERRED EMBODIMENT

Figure 1:
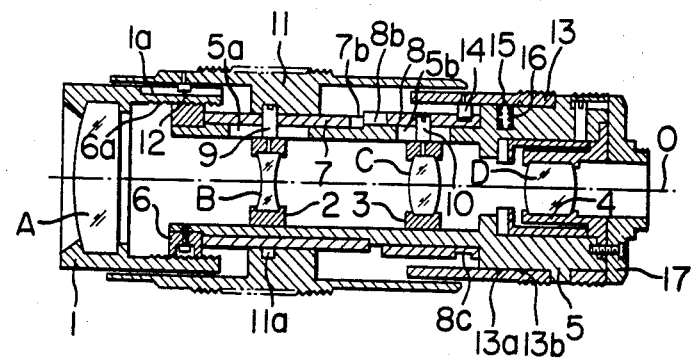
FIG. 1 is a cross-sectional view showing an embodiment of a zoom lens in accordance with the present invention.

Referring to FIG. 1, a zoom lens in accordance with the invention includes a focusing lens A, a variator lens B, a compensator lens C and a master lens D. The lenses A, B, C, and D are held by holding frames 1, 2, 3, and 4, respectively. A mount 17 adapted to be coupled to a camera (not shown) is secured to a fixed barrel 5 having axially extending guide channels or slots 5a and 5b.

The focusing lens holding frame 1 is rotatable about the optical axis 0 of the lens, the frame being threaded by means of a thread 6a onto a threaded member 6 attached to the forward end of the fixed barrel 5. Rotation of the holding frame 1 causes advancement and retraction of the focusing lens A with respect to the fixed barrel for focusing. As will be explained, holding frames 2 and 3 are slideably mounted within the fixed barrel 5 between the focusing lens A and the master lens D.

An operating ring 11 is coaxially fitted to the fixed barrel 5 and is axially slideable with respect to the optical axis and rotatable about the optical axis. A pin 12 secured to the operating ring 11 is received in an axially extending rectilinear groove 1a formed in the holding frame 1. Pin 12 and groove 1a serve to control the axial movement of the operating ring 11 so that the operating ring slides axially with respect to the optical axis. Pin 12 and groove 1a also serve to transmit the rotation of the operating ring to holding frame 1 for focusing.

Figure 2:
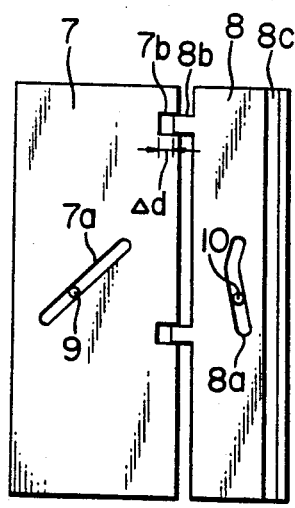
FIG. 2 is a developed view of certain portions of FIG. 1.

As shown in FIG. 1, a first cam ring 7 and a second cam ring 8 are also coaxially fitted to the fixed barrel 5. The first cam ring 7 is formed with a cam groove 7a as shown in FIG. 2. A cam follower pin 9 fixed to the variator holding frame 2 extends through channel 5a and cam groove 7a into an annular or ring-shaped groove 11a on the inner surface of the operating ring 11. Accordingly, the holding frame 2 is not moved by rotation of the operating ring 11 but is moved axially with respect to the optical axis only by the axial movement of the operating ring. The second cam ring 8 is also formed with a cam groove 8a, as shown in FIG. 2, and a cam follower pin 10 fixed to the compensator lens holding frame 3 extends through channel 5b and fits into cam groove 8a.

The first cam ring 7 and the second cam ring 8 are operatively associated such that rotation of one cam ring is transmitted to the second cam ring and such that the cam rings are movable relative to each other in the axial direction of the optical axis. This is accomplished in the following manner. As shown in FIG. 2, one or more U-shaped recesses or notches 7b of the first cam ring 7 receive corresponding inverted U-shaped convex portions or tabs 8b of the second cam ring 8. The notches and tabs are sized to permit the cam rings to be moved axially with respect to one another by a predetermined amount Δd. This predetermined amount Δd permits relative displacement of lenses B and C, which is useful for macro-photography. As shown in FIG. 2, the notches and the tabs are sized to remain engaged during relative axial displacement of the cam rings so that the cam rings may be rotated as a unit.

A change-over ring 13 (FIG. 1) is disposed for sliding movement on the fixed barrel 5 along the optical axis. A pin 14 fixed to the change-over ring 13 fits in an annular or ring-shaped groove 8c formed in the second cam ring 8. Thus, when the change-over ring 13 is moved axially, the second cam ring 8 is also moved correspondingly. The amount of displacement of the change-over ring 13 is determined by click grooves 13a, 13b formed in the inner surface of the change-over ring and a click ball 15, biased by a spring 16, disposed on the fixed barrel 5. The spacing between the click grooves corresponds to the aforementioned distance Δd. The click grooves and spring-biased ball constitute releaseable holding means for holding the change-over ring in predetermined axial positions.

The operation of the lens will now be described. FIGS. 1 and 2 show the state in which the change-over ring 13 is in position for normal photography. In this state, when the operating ring 11 is moved axially, the variator lens B is also moved axially due to the engagement between pin 9 and annular groove 11a. Axial movement of the variator lens causes the first cam ring 7 to be rotated by the action of pin 9 engaging cam groove 7a. This rotation is transmitted to the second cam ring 8 through the recesses 7b and tabs 8b. Therefore, the compensator lens C effects a predetermined movement as a result of pin 10 being guided by the cam groove 8a. The relative axial positions of the first and second cam rings 7 and 8 are not varied by axial movement of the operating ring; however, their rotation does vary the axial positions of lenses B and C in order to effect zooming.

On the other hand, rotation of the operating ring 11 does not cause rotation of the cam rings, and thus produces no axial movement of lenses B and C, but does cause axial movement of focusing lens A. As the operating ring is rotated, engagement between pin 12 and the sides of groove 1a causes holding frame 1 to rotate and focusing lens A to be advanced or retracted by virtue of the threaded engagement between its holding frame and the fixed barrel 5.

When the change-over ring 13 is moved axially (forced out leftwardly from the position of FIG. 1), the second cam ring 8 is also moved axially in the same direction (leftwardly in FIGS. 1 and 2) by the action of pin 14 and groove 8c. Therefore, the compensator lens C is also moved axially through the engagement of cam groove 8a and pin 10. In the course of this movement, the relative axial positions between lenses B and C is varied, causing the photographing magnification to be varied for the purpose of macro-photography. When the compensator lens has been moved by Δd, a predetermined macro-photography magnification is brought about and a click stop (13b) is actuated.

Change-over to macro-photography by the change-over ring 13 is possible when the operating ring 11 is at any position of its zooming operation area. Therefore, macro-photography becomes possible at any focal length within the variable focal length range of the lens. Further, since the operating ring 11 and the change-over ring 13 are discrete from each other, the change-over from normal photography to macro-photography, and the converse change-over, can be accomplished readily, thus enhancing the operability and quick photographability of the lens.

Although in the foregoing embodiment the compensator lens C is moved for macro-photography, the variator lens B may also be moved for macro-photography. That is, the relative axial positions of the variator lens and the compensator lens can be changed by moving one or both lenses.

Significantly, according to the present invention as described above, separate cam rings are provided for moving the variator lens and the compensator lens, respectively. Each cam ring independently controls the movement of its associated lens, but the cam rings are operatively associated such that they operate as a unit for zooming operation by axial movement of the operating ring, while allowing the relative axial positions of the two cam rings to be varied by the change-over ring for change-over to macro-photography. Thus, there is provided a one-hand zoom lens which is very simple in construction and which permits macro-photography at any desired focal length.

While the preferred embodiment of the invention has been shown and described, it will be apparent to those skilled in the art that changes can be made in this embodiment without departing from the principles and spirit of the invention, the scope of which is defined in the appended claims.

What is claimed is:

1. A zoom lens capable of macro-photography comprising first and second movable lens means; first and second cam rings rotatably disposed with respect to the optical axis of the lens and coupled to the first and second lens means, respectively, such that rotation of the first and second cam rings is effective to move the first and second lens means along the optical axis for zooming; means for operatively associating the first and second cam rings so that they rotate as a unit about the optical axis but are capable of relative axial movement with respect to one another; operating means for rotating the first and second cam rings to move the first and second lens means for zooming; and an axially movable change-over member having a pin received in an annular groove on one of said cam rings, movement of said member being effective for moving said one cam ring axially with respect to the other cam ring and for moving one lens means relatively to the other lens means for macro-photography.

2. The lens of claim 1, wherein the change-over member is effective to move axially one lens means relative to the other lens means at any point within the zooming range of the lens.

3. The lens of claim 1, wherein the means for operatively associating the first and second cam rings comprises recess means on one cam ring and corresponding tab means on the other cam ring received in said recess means, the recess means and the tab means being sized to permit a predetermined relative axial movement between the first and second cam rings while remaining effective to transmit rotation of one of said cam rings to the other of said cam rings.

4. The lens of claim 3, wherein the first and second cam rings have first and second cam grooves, respectively, receiving corresponding cam follower members of said first and second lens means, such that rotation of the cam rings is effective to impart a predetermined axial movement to the first and second lens means.

5. The lens of claim 3, wherein the operating means comprises an operating ring capable of axial and rotational movement with respect to the optical axis, axial movement of the operating ring being effective to rotate the first and second cam rings as a unit without changing their relative axial positions.

6. The lens of claim 5 comprising focusing lens means having a frame with a slot receiving a pin connected to the operating ring, engagement between the slot and the pin being effective to impart axial movement to the focusing lens means for focusing when the operating ring is rotated and being effective to permit axial movement of the operating ring without changing the axial position of the focusing lens means.

7. A zoom lens capable of macro-photography comprising focusing lens means; first and second movable lens means; first and second cam rings for moving the first and second movable lens means, respectively; means for operatively associating the first and second cam rings so that they rotate as a unit about the optical axis of the lens but are capable of relative axial movement with respect to one another; an operating ring capable of axial and rotational movement with respect to the optical axis, rotation of the operating ring being effective to impart axial movement to the focusing lens means for focusing, and axial movement of the operating ring being effective to rotate the first and second cam rings as a unit without changing their relative axial positions to impart axial movement to the first and second lens means for zooming; a changeover ring for varying the relative axial positions of the first and second cam rings while maintaining said operative association between said first and second cam rings for rotation as a unit, axial movement of the first and second cam rings relative to one another being effective to vary the relative axial positions of the first and second movable lens means, a fixed lens barrel, said operating ring, said cam rings, and said change-over ring being coaxially fitted on the fixed lens barrel, and releasable holding means for releasably holding the first and second cam rings in first and second relative axial positions with respect to one another, said releasable holding means comprising first and second click grooves spaced a predetermined distance apart on the change-over ring and a spring-biased ball on the fixed lens barrel adapted to be received in the click grooves.

8. The lens of claim 7, wherein the change-over ring is effective to vary the relative axial positions of the first and second means at any point within the zooming range of the lens.

9. The lens of claim 7, wherein the means for operatively associating the first and second cam rings comprises recess means on the first cam ring and corresponding tab means on the second cam ring received in said recess means, the recess means and the tab means being sized to permit a predetermined relative axial movement between the first and second cam rings while remaining effective to transmit rotation of one of said cam rings to the other of said cam rings.

10. The lens of claim 7, wherein the change-over ring has a pin received in an annular groove on one of said cam rings, axial movement of the change-over ring being effective to axially move said one cam ring with respect to the other cam ring.

11. The lens of claim 7, wherein the first and second cam rings have first and second cam grooves, respectively, receiving corresponding cam follower members of said first and second movable lens means such that rotation of said cam rings is effective to impart a predetermined axial movement to the first and second movable lens means.

12. The lens of claim 7, wherein the focusing lens means has a frame with a rectilinear slot receiving a pin attached to the operating ring, engagement between the slot and the pin being effective to rotate the focusing lens means when the operating ring is rotated and being effective to permit axial movement of the operating ring without changing the axial position of the focusing lens means.

* * * * *